Oct. 2, 1951          W. RINKER          2,569,579
PROJECTION MEASURING DEVICE WITH SCREEN AND SCALE SECTIONS
Filed June 2, 1950
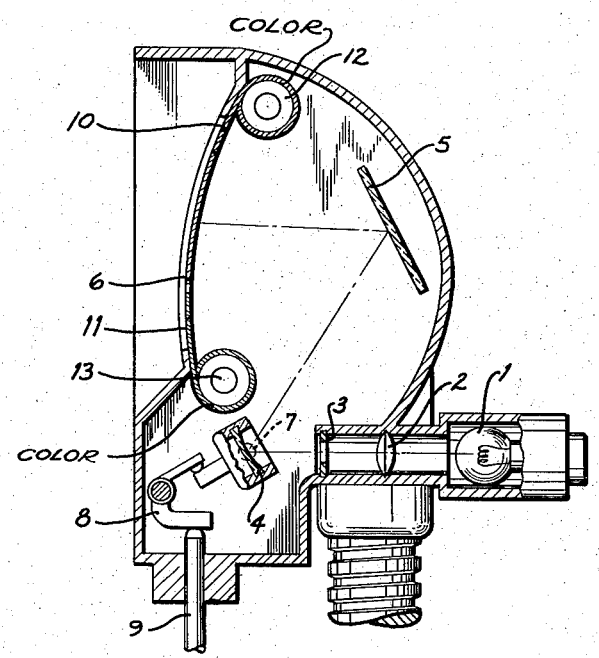
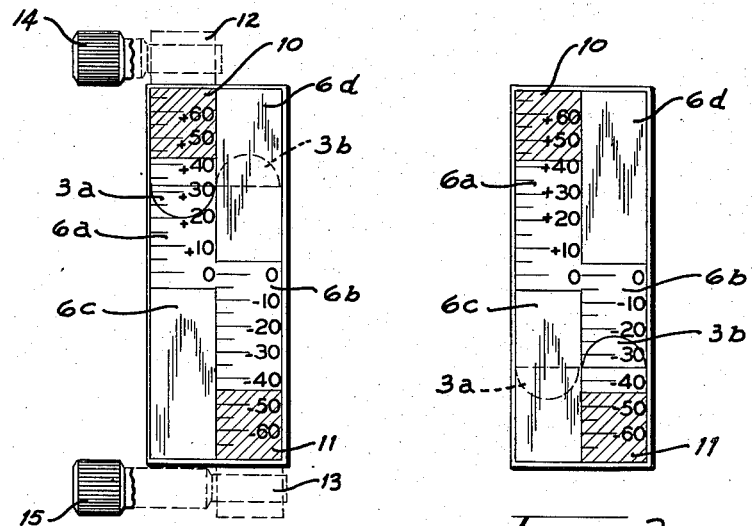
INVENTOR.
WILHELM RINKER
BY
Fred A. Klein.
ATTORNEY Patented Oct. 2, 1951

2,569,579

UNITED STATES PATENT OFFICE 2,569,579

PROJECTION MEASURING DEVICE WITH SCREEN AND SCALE SECTIONS

Wilhelm Rinker, Wetzlar, Germany, assignor to Ernst Leitz G. m. b. H., Wetzlar, Germany, a corporation of Germany Application June 2, 1950, Serial No. 165,679
In Germany September 16, 1949

8 Claims. (Cl. 88—24)

This invention relates to measuring apparatus, and more particularly to gauges where measurements are read by means of a light pointer moving on a calibrated screen.

In known devices of this type, the light pointer is produced by reflecting the image of a circular aperture by means of one or several mirrors onto a frosted glass pane. The pointer is moved along the scale on the screen by the angular displacement of one of the mirrors which is actuated either directly or through an intermediate control member by the measuring rod or gauge. Such measuring instruments may also be provided with adjustable marks to indicate the limiting values.

It is an object of the present invention to provide a measuring apparatus of the nature described in which the reading of measurements is greatly facilitated.

It is also an object of this invention to provide such a measuring apparatus with simple means to enable the operator to make highly accurate readings with ease.

It is a further object of the invention to provide a sorting gauge adapted to enable the operator to determine with one glance upon the measuring scale whether an article to be tested has dimensions outside the set tolerance limits.

The above and other objects are accomplished in accordance with the invention by providing two scale sections on the reading screen, each section carrying a scale extending over at least half of the range to be covered. The two scale sections are arranged adjacent one another in a common plane and the scales are so displaced in the direction of the scale extension in respect to each other that they overlap only over a small portion of the scale; the overlapping region of the two scales is preferably located in the vicinity of the zero mark.

According to another feature of this invention, transparent colored ribbons may be used to delineate the tolerance limits by moving or sliding these ribbons into alignment with the scale sections. Preferably, each ribbon is inserted at one end of each of the scale sections and moved to register with a portion of the respective scale. When the light pointer is reflected upon that portion of the scale section, it will appear in color.

It is a further feature of this invention that those areas inside the screen frame which are not used for the scales are made opaque.

In accordance with still another feature of this invention, the light pointer may be formed by two identical sections, such as two halves of a circuliar disc, one half being arranged as the laterally displaced mirror image of the other half. In the case of a semi-circular light pointer, such an arrangement will result in the alignment of the diameters of the two halves, the two semi-circular discs being positioned at opposite sides of the line formed by the diameters so that the measured value can be read on the scale at either or both of the diameters.

The above and other objects, features and advantages of the present invention will become more apparent in connection with the following specification and drawings, in which:

Fig. 1 is a cross-section of an indicating device for a measuring instrument according to this invention;

Fig. 2 is a front view of the screen showing the scale sections and the ribbon adjusting device according to this invention; and Fig. 3 is a front view of the screen with the scales showing a different measurement indication than in Fig. 2.

Referring now to the drawings, which illustrate one embodiment of the invention applicable, for instance, to a gauge, 1 indicates a light source and 2 a condenser lens illuminating the aperture 3, whose image is thrown onto screen 6 by means of concave mirror 4 and plane mirror 5. The aperture 3 has the shape of the pointer 3a, 3b (see Figs. 2 and 3). The concave mirror is pivotable around axis 7 and is controlled by U-shaped lever 8 which is actuated by gauge pin 9. Screen 6 is divided into the two sections 6a and 6b, each provided with a scale. The scale sections are arranged side by side but the scales are displaced in the direction of extension of the scale so that the scales overlap only over a short distance in the vicinity of the zero mark. The portions 6c and 6d of the screen, which are not used, are preferably covered to be non-transparent.

Two ribbons 10 and 11, preferably of different color, are wound on rollers 12 and 13 and can be slid onto the screen 6 by turning knobs 14 and 15.

When the indicating device is used, for instance in a thickness gauge, the tolerance limits are first adjusted by shifting the colored ribbons 10 and 11 so that their terminations coincide with the limits as read on the scale such as ±45 in Figs. 2 and 3. The article to be measured is then introduced and, depending on its thickness, either the light pointer section 3a or 3b will appear in the left or right section of the screen, as shown in Figs. 2 and 3, respectively. If the diameter of the semi-circular disc pointer is within the colored portion of the scale, the tolerance limit has been exceeded by the tested article. The exact measure can be read on the scale.

Although a particular embodiment has been shown and described, it will be understood that the invention is not limited thereto and that modifications thereof may be made within the scope of the present invention.

What is claimed is:

1. An indicating device for measuring apparatus comprising in combination: a light source; means for forming an image of said light source as an indicia mark; a screen; reflective means adapted to throw said image onto said screen; means for gauging a work piece; pivotable means forming part of said reflective means and being actuated by said gauging means to change the location of the indicia image on the screen in response to a movement of the gauging means controlled by the dimension of said work piece; a scale arranged on said screen and consisting of two scale sections arranged side by side each other and being longitudinally displaced so that only a fraction of each of said scale sections lies in an overlapping region, said indicia image being thrown onto one or the other of said scale sections, depending on said movement of the gauging means.

2. An indicating device for measuring apparatus comprising in combination: a light source; an aperture arranged in front of said light source and having the form of a desired indicia mark; a screen; a gauging pin; pivotable reflective means adapted to form an image of said aperture on said screen, said reflective means being adapted to be pivoted by said gauging pin in response to a movement of the pin controlled by the dimension of a work piece to be measured; a scale arranged on said screen and consisting of two scale sections arranged side by side each other and being longitudinally displaced so that only a fraction of each of said scale sections lies in an overlapping region, said indicia mark being formed on one or the other of said scale sections, depending on said movement of the gauging pin.

3. An indicating device as defined in claim 1, wherein one of said scale sections contains positive measuring marks to indicate a dimension of the work piece in excess of the norm, the other of said scale sections contains negative measuring marks to indicate a dimension of the work piece smaller than the norm, and said overlapping region includes the zero marks on both scale sections, said zero marks being aligned.

4. An indicating device as defined in claim 1, wherein the parts of the screen covered by the scale sections are transparent while the rest of the screen is opaque.

5. An indicating device for measuring apparatus comprising, in combination: a light source; an aperture in front of said light source and having the form of a desired indicia mark; a screen; means for gauging a work piece; reflective means including pivotable means adapted to form an image of said aperture on the screen, said pivotable means being adapted to be actuated by a movement of the gauging means controlled by the dimension of said work piece; a scale arranged on said screen and consisting of two scale sections arranged side by side each other and being longitudinally displaced so that only a fraction of each of said scale sections lies in an overlapping region, said indicia mark being formed on one or the other of said scale sections, depending on said movement of the gauging means; and adjustable masking means arranged to be brought into registration with a portion of each of said scale sections.

6. An indicating device as defined in claim 5, wherein said masking means comprises two transparent colored ribbons carried by rotatable support means arranged adjacent each of said scale sections.

7. An indicating device for measuring apparatus comprising in combination: a light source; an aperture in front of said light source and having the form of a desired indicia mark; a screen carrying two scale sections arranged side by side each other and being longitudinally displaced so that only a fraction of each of said scale sections lies in an overlapping region, the part of the screen carrying the scale sections being transparent while the rest of the screen is opaque; a gauging pin; reflective means including pivotable means adapted to form an image of said aperture on said screen, said pivotable means being adapted to be actuated by a movement of the gauging pin controlled by the dimension of a work piece to be measured; said image of the aperture forming the indicia mark comprising two identical portions arranged adjacent each other and one being the mirror image of the other, each of said indicia mark portions being adapted to be shown on said transparent screen scale sections while the other portion of the mark is covered by the opaque part of the screen, the position of the indicia mark depending on said movement of the gauging pin.

8. An indicating device as defined in claim 7, wherein said indicia mark comprises two semi-circular discs, each disc registering with one of said scale sections, and said discs being arranged so that their diameters are in a straight line and the discs are positioned on opposite sides of said line.

WILHELM RINKER.

REFERENCES CITED

The following references are of record in the file of this patent:

UNITED STATES PATENTS

| Number | Name | Date |
| --- | --- | --- |
| 1,456,847 | Geyer | May 29, 1923 |
| 1,899,804 | Hopfield | Feb. 28, 1933 |
| 1,939,161 | Bestelmeyer | Dec. 12, 1933 |
| 2,116,217 | Schwarz | May 3, 1938 |
| 2,150,398 | Paulson | Mar. 14, 1939 |
| 2,176,673 | Krause | Oct. 17, 1939 |
| 2,244,523 | Hess | June 3, 1941 |
| 2,288,243 | Hyde | June 30, 1942 |
| 2,322,813 | Beck | June 29, 1943 |
| 2,471,800 | Von Mulinen | May 31, 1949 |